United States Patent
Mitsuoka et al.

(10) Patent No.: US 11,993,688 B2
(45) Date of Patent: May 28, 2024

(54) MOLDED ARTICLE OF CARBON FIBER COMPOSITE MATERIAL AND PRODUCTION METHOD FOR MOLDED ARTICLE OF CARBON FIBER COMPOSITE MATERIAL

(71) Applicant: Toray Industries, Inc., Tokyo (JP)

(72) Inventors: Hideto Mitsuoka, Nagoya (JP); Yuji Ozeki, Nagoya (JP)

(73) Assignee: Toray Industries, Inc., Tokyo (JP)

(*) Notice: Subject to any disclaimer, the term of this patent is extended or adjusted under 35 U.S.C. 154(b) by 139 days.

(21) Appl. No.: 17/435,200

(22) PCT Filed: Mar. 25, 2020

(86) PCT No.: PCT/JP2020/013259
§ 371 (c)(1),
(2) Date: Aug. 31, 2021

(87) PCT Pub. No.: WO2020/196600
PCT Pub. Date: Oct. 1, 2020

(65) Prior Publication Data
US 2022/0145025 A1 May 12, 2022

(30) Foreign Application Priority Data
Mar. 28, 2019 (JP) ................... 2019-063617

(51) Int. Cl.
*C08J 5/24* (2006.01)
*B29C 33/68* (2006.01)
(Continued)

(52) U.S. Cl.
CPC ............ *C08J 5/243* (2021.05); *B29C 33/68* (2013.01); *B29C 70/42* (2013.01); *B29C 71/009* (2013.01);
(Continued)

(58) Field of Classification Search
CPC ........ C08J 5/243; C08J 5/128; C08J 2323/12; C08J 2323/20; C08J 2463/00;
(Continued)

(56) References Cited

U.S. PATENT DOCUMENTS 9,803,061 B2   10/2017   Hattori et al.
10,737,406 B2   8/2020   Abe et al.
(Continued)

FOREIGN PATENT DOCUMENTS

JP   H08-319462 A   12/1996
JP   H09-316763 A   12/1997
(Continued)

OTHER PUBLICATIONS

Espacenet Translation of JP-2017013456-A (Year: 2023).*
(Continued)

*Primary Examiner* — Michael Zhang
(74) *Attorney, Agent, or Firm* — DLA Piper LLP (US)

(57) ABSTRACT

A molded article of a carbon fiber composite material includes at least carbon fibers and a resin composition. The molded article of a carbon fiber composite material is characterized in that the surface roughness Ra thereof is 0.01-2 μm and in that the tensile shear adhesive strength (F0) thereof when a metal has been adhered to the surface thereof via an adhesive layer that contains an epoxy compound and is 0.1-3 mm thick is 10-40 MPa.

13 Claims, 1 Drawing Sheet

(51) Int. Cl.
  *B29C 70/42*       (2006.01)
  *B29C 71/00*       (2006.01)
  *B29K 63/00*       (2006.01)
  *B29K 105/08*      (2006.01)
  *B29K 307/04*      (2006.01)
  *B32B 5/02*        (2006.01)
  *B32B 5/26*        (2006.01)
  *B32B 7/12*        (2006.01)
  *B32B 15/085*      (2006.01)
  *B32B 15/18*       (2006.01)
  *B32B 27/12*       (2006.01)
  *B32B 27/32*       (2006.01)
  *C08J 5/12*        (2006.01)

(52) U.S. Cl.
  CPC .............. *B32B 5/024* (2013.01); *B32B 5/263* (2021.05); *B32B 7/12* (2013.01); *B32B 15/085* (2013.01); *B32B 15/18* (2013.01); *B32B 27/12* (2013.01); *B32B 27/32* (2013.01); *C08J 5/128* (2013.01); *B29K 2063/00* (2013.01); *B29K 2105/0881* (2013.01); *B29K 2307/04* (2013.01); *B32B 2260/021* (2013.01); *B32B 2260/046* (2013.01); *B32B 2262/106* (2013.01); *B32B 2307/538* (2013.01); *B32B 2307/542* (2013.01); *C08J 2323/12* (2013.01); *C08J 2323/20* (2013.01); *C08J 2463/00* (2013.01)

(58) Field of Classification Search
  CPC ........ B29C 33/68; B32B 5/024; B32B 5/263; B32B 15/085; B32B 15/18; B32B 27/12; B32B 27/32; B32B 2260/021; B32B 2260/046; B32B 2262/106; B32B 2307/538; B32B 2307/542; B29K 2063/00; B29K 2105/0881; B29K 2307/04
  See application file for complete search history.

(56) References Cited

U.S. PATENT DOCUMENTS

| | | |
|---|---|---|
| 2003/0219604 A1 | 11/2003 | Yamamoto et al. |
| 2006/0272768 A1 | 12/2006 | Kitamura et al. |
| 2014/0296414 A1* | 10/2014 | Hattori .................. B29B 7/90 524/495 |
| 2014/0363646 A1 | 12/2014 | Hayashi et al. |
| 2016/0340562 A1 | 11/2016 | Fujii et al. |
| 2017/0157803 A1 | 6/2017 | Kuma et al. |
| 2018/0186134 A1 | 7/2018 | Imai et al. |
| 2020/0047376 A1 | 2/2020 | Takahashi et al. |
| 2020/0087506 A1 | 3/2020 | Oota et al. |
| 2021/0130614 A1 | 5/2021 | Wakioka et al. |

FOREIGN PATENT DOCUMENTS

| | | | | |
|---|---|---|---|---|
| JP | 2002-176266 | A | | 6/2002 |
| JP | 2003-221458 | A | | 8/2003 |
| JP | 2003-334903 | A | | 11/2003 |
| JP | 2004-269878 | A | | 9/2004 |
| JP | 2006-257399 | A | | 9/2006 |
| JP | 2006-305867 | A | | 11/2006 |
| JP | 2007126644 | A | * | 5/2007 |
| JP | 2008-132650 | A | | 6/2008 |
| JP | 2012218257 | A | * | 11/2012 |
| JP | 2013-006974 | A | | 1/2013 |
| JP | 2014-001384 | A | | 1/2014 |
| JP | 2015-232108 | A | | 12/2015 |
| JP | 2016-203493 | A | | 12/2016 |
| JP | 2017-013456 | A | | 1/2017 |
| JP | 2017013456 | A | * | 1/2017 ............ B29C 33/68 |
| JP | 2017-128683 | A | | 7/2017 |
| JP | 2018-202804 | A | | 12/2018 |
| JP | 2019-005966 | A | | 1/2019 |
| WO | WO-2013191073 | A1 | * | 12/2013 ............ B32B 5/12 |
| WO | 2014/083662 | A1 | | 6/2014 |
| WO | 2016/006578 | A1 | | 1/2016 |
| WO | 2018/139559 | A1 | | 8/2018 |
| WO | 2018/216524 | A1 | | 11/2018 |

OTHER PUBLICATIONS

Espacenet Translation of JP-2012218257-A (Year: 2023).*
Espacenet Translation of JP-2007126644-A (Year: 2023).*
ip.com translation of WO-2013191073-A1 (Year: 2023).*
Extended European Search Report dated Nov. 15, 2022, of counterpart European Patent Application No. 20778231.9.
Notice of Reasons for Refusal dated Feb. 6, 2024, along with the Written Opinion and Written Amendment dated Apr. 4, 2024, of counterpart Japanese Patent Application No. 2021-509490, along with English machine translation.

* cited by examiner

MOLDED ARTICLE OF CARBON FIBER COMPOSITE MATERIAL AND PRODUCTION METHOD FOR MOLDED ARTICLE OF CARBON FIBER COMPOSITE MATERIAL

TECHNICAL FIELD

This disclosure relates to a molded article of a carbon fiber composite material exhibiting high tensile lap-shear strength in adhesive bonding with a metal material.

BACKGROUND

To bond a molded article with another molded article of the same kind or a different kind of material, the following methods are available: a mechanically fastening method with a bolt or a screw; a bonding method using an adhesive; and a bonding method in which a surface of a material is temporarily softened and brought into contact with another material before being cured. Examples of the bonding with use of an adhesive include the following.

It is known that, in bonding a carbon-fiber-reinforced thermosetting resin and a thermoplastic resin to each other, the thermoplastic resin and the thermoplastic resin are well bonded to each other when the absolute value of the difference between the total surface free energy of the thermoplastic resin composition and the total surface free energy of the thermosetting resin composition is set to 10 mJ/m$^2$ (Japanese Patent Laid-open Publication No. 2004-269878).

It is known that when crystalline thermoplastic resins are bonded to each other with an adhesive layer interposed therebetween, dry treatment is performed with control of the rate of change in the surface free energy of the material before and after the treatment, whereby favorable adhesion is achieved between the crystalline thermoplastic resins (Japanese Patent Laid-open Publication No. 2017-128683).

It is known that, in bonding aluminum and a thermoplastic resin with an adhesive layer made of a thermosetting resin being interposed therebetween, favorable adhesion is achieved by controlling the relationship between the surface free energy of a base treatment film formed on the aluminum surface, the surface free energy of a layer of the thermosetting resin, and the surface roughness of the base treatment film on the aluminum surface (Japanese Patent Laid-open Publication No. 2008-132650).

In bonding a molded article of a carbon fiber composite material and a metal with an adhesive interposed therebetween, the design and combination of materials for the molded article of the carbon fiber composite material, the adhesive, and the metal have been selected based on the relative relationship of their characteristics. Therefore, even when a carbon fiber composite material having excellent characteristics has been developed, it may be difficult to use a molded article of the foregoing carbon fiber composite material due to other factors such as characteristics of an adhesive to be used in combination or metal materials to be bonded.

When a carbon fiber composite material is molded into a molded article, a mold release agent may be applied to the molding die before molding operation, or a material to be molded may be interposed between mold release films so that the molded article can be easily taken out from the molding die. Thus, a part of the release agent or the component of the release film adheres to the surface of the molded article taken out from the molding die. There have been instances where this adhering substance inhibits bonding by an adhesive and reduces bonding force in a subsequent step or in processing when the molded article is used.

Furthermore, when the molded article is bonded to a molded article of another resin or a fiber-reinforced resin, or a metal, with an adhesive interposed therebetween in a subsequent step, a release agent and a release film component are removed by abrasion of the surface of the molded article by a blasting treatment, or a pretreatment such as forming irregularities on the surface is carried out by applying a peel ply. Therefore, there are problems such as an increase in takt time of a manufacturing process caused by machining, and an increase in machining cost.

It could therefore be helpful to provide a molded article of a carbon fiber composite material that can be bonded well regardless of the type of adhesive or metal used in combination, and can maintain the bonding strength even after a long time elapses after bonding, as well as to provide a molded article that can be favorably bonded with an adhesive without performing a blasting treatment or the like that takes a long processing time after molding.

SUMMARY

We thus provide:
(1) A molded article of a carbon fiber composite material including at least a carbon fiber and a resin composition, having a surface roughness Ra of 0.01 μm or more and 2 μm or less, and having a tensile lap-shear strength (F$_0$) of 10 MPa or more and 40 MPa or less when the molded article is bonded with a metal with an adhesive layer containing an epoxy compound being interposed therebetween, the layer having a thickness of 0.1 mm or more and 3 mm or less on a surface of the molded article.
(2) The molded article of the carbon fiber composite material according to the above-described item, wherein the molded article has a surface free energy ($\gamma_{TOTAL}$) of 30 mJ/m$^2$ or more and 80 mJ/m$^2$ or less, and a ratio $\{\gamma_p/\gamma_d\}$ between a surface free energy dispersion component ($\gamma_d$) and a surface free energy polar component ($\gamma_p$) constituting the surface free energy ($\gamma_{TOTAL}$) is 0 or more and 1 or less.
(3) The molded article of the carbon fiber composite material according to any one of the above-described items, wherein a ratio $\{F/C\}$ of the number of atoms of fluorine (F) with respect to the number of atoms of carbon (C) on a surface of the molded article, measured by X-ray photoelectron spectroscopy, is 0 or more and 0.5 or less.
(4) The molded article of the carbon fiber composite material according to any one of the above-described items, wherein a ratio $\{O/C\}$ of the number of atoms of oxygen (O) with respect to the number of atoms of carbon (C) on a surface of the molded article, measured by X-ray photoelectron spectroscopy, is 0.2 or more and 1.2 or less.
(5) The molded article of the carbon fiber composite material according to any one of the above-described items, wherein an intensity ratio $\{X/M\}$ of a peak (X) attributed to C—O and C—N with respect to a main peak (M) in narrow scan with deconvoluted C1s peaks obtained by measurement on a surface of the molded article by X-ray photoelectron spectroscopy is 0.4 or more and 0.8 or less.
(6) The molded article of the carbon fiber composite material according to any one of the above-described items, wherein an intensity ratio $\{Y/M\}$ of a peak (Y)

attributed to C=O with respect to a main peak (M) in narrow scan with deconvoluted C1s peaks obtained by measurement on a surface of the molded article by X-ray photoelectron spectroscopy is 0.1 or more and 0.3 or less.

(7) The molded article of the carbon fiber composite material according to any one of the above-described items, wherein an intensity ratio {Z/M} of a peak (Z) attributed to C(=O)—O with respect to a main peak (M) in narrow scan with deconvoluted C1s peaks obtained by measurement on a surface of the molded article by X-ray photoelectron spectroscopy is 0.1 or more and 0.3 or less.

(8) The molded article of the carbon fiber composite material according to any one of the above-described items, wherein the carbon fiber has an average diameter of 1 to 20 μm, and an average length of 10 mm or more, and a content of the carbon fiber contained in the carbon fiber composite material is 5 to 75 vol %.

(9) The molded article of the carbon fiber composite material according to any one of the above-described items, wherein the resin composition contained in the molded article of the carbon fiber composite material is a thermosetting resin composition containing an epoxy resin.

(10) The molded article of the carbon fiber composite material according to any one of the above-described items, wherein a ratio $\{F_{11}/F_0\}$ of a tensile lap-shear strength $(F_0)$ with respect to a tensile lap-shear strength $(F_{11})$ measured after a wet heat treatment, is 0.75 or more and 1 or less.

(11) A method of producing the molded article of the carbon fiber composite material according to any one of the above-described items, by molding the carbon fiber composite material, wherein a release agent containing a fluorine element or a release film containing a fluorine element is used in the molding.

(12) The method of producing the molded article of the carbon fiber composite material, wherein, after press-molding, the surface of the carbon fiber composite material is subjected to a plasma treatment.

Our molded article of the carbon fiber composite material can be bonded well regardless of the type of adhesive or metal used in combination, and it is possible to provide a molded article of a carbon fiber composite material that has a bonding strength maintained even after a long time elapses after bonding.

As described above, good adhesion can be achieved regardless of the type of adhesive or metal used in combination, and thus, by using the molded article of the carbon fiber composite material. Thereby, a structure having a shape and characteristics that have been conventionally impossible, for example, bondability with a material having completely different mechanical characteristics, can be created when designing a final product.

In addition, even when a release agent, a release film or the like is used at the time of molding the carbon fiber composite material as in conventional use, a pretreatment that requires a long treatment time such as a blasting treatment, is not required before bonding, and thus it is possible to contribute to cost reduction.

DETAILED DESCRIPTION

First, the carbon fiber composite material is be described. An article obtained by molding a carbon fiber composite material is also a carbon fiber composite material, and a carbon fiber composite material before being molded into a desired form is also a carbon fiber composite material. However, to distinguish these before and after molding, the former is referred to as a molded article of a carbon fiber composite material, and the latter is simply referred to as a carbon fiber composite material.

It is important to use a carbon fiber in the carbon fiber composite material so that excellent mechanical properties and easiness in designing thereof should be exhibited.

The carbon fiber composite material contains at least a carbon fiber and a resin composition. When a carbon fiber is present in an amount of 1% by mass or more with respect to a resin in a resin composition, filaments of the carbon fiber are in good close contact with the resin forming a matrix around the filaments of the carbon fiber, and the carbon fiber composite material exhibits excellent mechanical characteristics.

As the carbon fiber used in the carbon fiber composite material, a polyacrylonitrile-based carbon fiber is preferably used. When the carbon fiber is polyacrylonitrile-based, the carbon fiber composite material is excellent from the viewpoint of being able to realize low cost while having a good balance among specific strength, specific rigidity, lightness, and conductivity.

The carbon fiber in the carbon fiber composite material and a molded article obtained therefrom preferably has an average fiber diameter of 1 to 20 μm, more preferably 3 to 15 μm, and most preferably 4 to 10 μm.

Within the above range, the molded article of the carbon fiber composite material can exhibit excellent mechanical characteristics and processing characteristics.

Filaments of the carbon fiber in the carbon fiber composite material and a molded article obtained therefrom may be continuous or discontinuous, but preferably have an average length of 10 mm or more and 2000 mm or less. Within the above range, excellent specific strength and non-rigidity can be imparted.

The carbon fiber composite material and a molded article obtained therefrom preferably contain 5 to 75 vol % of a carbon fiber. With the content of the carbon fiber in the above range, excellent moldability can be imparted to the carbon fiber composite material, and mechanical characteristics can be imparted to a molded article. The content is more preferably 10 to 65 vol %.

It is important that a matrix portion in the carbon fiber composite material and a molded article therefrom is a resin composition. When the resin composition contains a resin, the resin composition can be easily composited with a carbon fiber, which allows the specific strength and the specific rigidity of the molded article, and the manufacturing price, to be maintained in a good balance.

The resin composition is not particularly limited and, for example, a thermosetting resin, a thermoplastic resin or the like can be used.

The resin composition to be used in the carbon fiber composite material preferably contains a thermosetting resin from the viewpoint of mechanical characteristics and processing characteristics during molding.

As the thermosetting resin, for example, the following can be used: an unsaturated polyester resin, a vinyl ester resin, an epoxy resin, a phenol resin (resol type), a urea melamine resin, a polyimide resin or the like; a copolymer or a modified product thereof; or a resin obtained by blending two or more kinds thereof.

Among them, an epoxy resin is preferable to obtain a molded article of a carbon fiber composite material having excellent mechanical characteristics, because the resin and a carbon fiber are easily blended. In addition, when an epoxy resin is used, molding is easy. Among them, an epoxy resin containing a bisphenol A type epoxy resin as a main component is preferable from the viewpoint of balance between economic efficiency and mechanical characteristics.

To improve impact resistance, an elastomer or a rubber component may be added to the thermosetting resin composition.

Examples of such a carbon fiber composite material include: a thermosetting prepreg or a thermoplastic prepreg in which a woven fabric, or filaments continuous in one direction, are used; a carbon-fiber-reinforced SMC or a carbon-fiber-reinforced stampable substrate in which carbon filaments are discontinuously and randomly dispersed; and a long fiber pellet, and a short fiber pellet, used in injection molding.

The method of molding the carbon fiber composite material can be appropriately selected from a resin transfer molding (RTM) method, an autoclave molding method, a press-molding method, a filament winding molding method and the like, but is not particularly limited thereto.

The following description describes examples that are preferable so that a molded article obtained from the carbon fiber composite material should achieve high tensile lap-shear strength and durability.

It is important that the surface roughness Ra of the molded article of the carbon fiber composite material is 0.01 μm or more and 2 μm or less. The smaller the value of Ra of the molded product, the smoother the surface of the molded article. When the value of Ra is less than 0.01 μm, the molded article may have a significantly low handleability in some instances. On the other hand, when the Ra of the molded article is more than 2 μm, filaments of a carbon fiber may be exposed on the surface of the material or the surface of the material may be deteriorated, thereby to have a reduced strength, resulting in that the surface may be easily broken in some instances.

To obtain a molded article of a carbon fiber composite material having an Ra of 0.01 to 2 it is important that filaments of a carbon fiber are uniformly dispersed in a resin composition, that a material having high smoothness is used for a die or a film that comes into contact with the resin composition during molding, and that adhesion to the mold and releasability therefrom are appropriately adjusted.

For example, when a molded article of a carbon fiber composite material is obtained by press-molding a prepreg of a carbon fiber impregnated with a thermosetting resin, a film having a small surface roughness is used between the prepreg and a die of a press device, or the temperature during processing is lowered so that projections and recesses on the film surface are less likely to be transferred, whereby a desired surface roughness Ra is obtained.

Furthermore, by subjecting the molded article of the carbon fiber composite material to the atmospheric pressure plasma treatment under the following conditions, even when a release agent, a release film or the like is used during molding, it is possible to impart good adhesive bondability to other members in a short time while keeping the value of Ra within the above range.

Example of Atmospheric Pressure Plasma Treatment Conditions:

| | |
|---|---|
| Plasma nozzle rotation speed | 1000 to 3000 rpm |
| Plasma nozzle back pressure | 40 to 60 mbar |
| Flow rate of gas from plasma nozzle | Q35-55 L/min |

Plasma power Pp: 400-490 W
Gas used: Air, oxygen or nitrogen treatment speed (movement speed of plasma nozzle during treatment): 1 m/min-10 m/min
Treatment distance (distance between the tip of the plasma nozzle and the material to be treated): 1 mm to 30 mm.

When the atmospheric pressure plasma treatment is performed, a plasma density Pd is preferably 7.2 to 14, the plasma density Pd being defined by the formula below with a power Pp (plasma power) determined by a voltage value and a current value for generating plasma, as well as a flow rate Q of gas flowing therein per unit time:

$$Pd=Pp/Q.$$

The surface roughness RSm of the molded article of the carbon fiber composite material is preferably 0.01 μm or more and 250 μm or less. This is because, when the surface roughness is in this range, the fine recesses and projections on the material surface are combined with the adhesive, thereby exerting the anchor effect, while the exposure of the carbon fibers on the material surface is minimized, which results in the enhancement of the adhesive bondability.

In addition, it is important that the molded article of the carbon fiber composite material has a tensile lap-shear strength of 10 MPa or more and 40 MPa or less when a metal is bonded onto the surface of the molded article with an epoxy-compound-containing adhesive being interposed therebetween, the adhesive having a thickness of 0.1 mm or more and 3 mm or less.

When the thickness of the adhesive formed on the surface of the molded article of the carbon fiber composite material is less than 0.1 mm, when the molded article of the carbon fiber composite material and the metal are distorted by heat, the difference between the expansion degrees thereof cannot be alleviated, and the molded article and the metal may be separated. On the other hand, when the thickness of the adhesive layer is more than 3 mm, the shear stress decreases, and the molded article and the metal as a bonded body may become unstable against a force applied from the outside.

The thickness of the adhesive formed on the surface of the molded article of the carbon fiber composite material is preferably 0.2 mm to 2.5 mm, and more preferably 0.3 mm to 2 mm, from the viewpoint of the adhesive strength and the productivity.

For example, to set the layer thickness of the adhesive within the above range, for example, the following may be performed: the adhesive is applied to either or both of the surface of the molded article of the carbon fiber composite material and the surface of the metal, and when the molded article and the metal are stuck to each other, glass beads having a particle diameter corresponding to a desired thickness are added therebetween, or a metal wire having a diameter corresponding to a desired thickness is installed therebetween. Then, the molded article and the metal are fastened with a clip, or either one of them is fixed and pressure is applied from the surface of the other one with the adhesive interposed therebetween.

It is important that the molded article of the carbon fiber composite material has a tensile lap-shear strength of 10 MPa or more and 40 MPa or less when a metal is bonded to the surface of the molded article with an adhesive containing an epoxy compound being interposed therebetween. It is important that the adhesive contains an epoxy compound. The epoxy compound is a compound having an epoxy group. As the epoxy compound is contained, the epoxy group therein chemically reacts with a functional group present on the surface of the molded article, and good adhesiveness and excellent tensile lap-shear strength can be imparted by chemical interaction caused by the reaction.

When the tensile lap-shear strength when a metal is bonded to the surface of the molded article with an adhesive containing an epoxy compound being interposed therebetween is less than 10 MPa, the molded article of the carbon fiber composite material has a weak adhesive bonding strength, and thus has low practical applicability for use in bonding structural members of automobiles, airplanes, buildings and the like.

On the other hand, when the tensile lap-shear strength is more than 40 MPa, when the molded article of the carbon fiber composite material and the metal are distorted by heat, the adhesive layer cannot follow the deformation, and the bonded body may be broken.

The tensile lap-shear strength is preferably 15 MPa to 35 MPa, and more preferably 20 to 30 MPa, from the viewpoint of substantial strength of the bonded body, and durability thereof at the time of deformation caused by heat.

So that the tensile lap-shear strength of a test body obtained by adhesive bonding of a molded article of the carbon fiber composite material and a metal should be 10 to 40 MPa, it is important to use an adhesive having more epoxy groups therein, uniformly apply the adhesive to the entire bonding surface, and sufficiently defoam the adhesive before application so that voids and air bubbles do not occur in the applied adhesive. This is because the larger the number of epoxy groups in the adhesive, the stronger the chemical interaction with functional groups present on the surface of the molded article of the carbon fiber composite material, and the smaller the number of voids and air bubbles in the adhesive, the higher the shear strength of the adhesive layer itself.

The surface free energy ($\gamma_{TOTAL}$) of the molded article of the carbon fiber composite material is preferably 30 mJ/m$^2$ or more and 80 mJ/m$^2$ or less. It is more preferably 35 to 75 mJ/m$^2$. When the surface free energy is 30 to 80 mJ/m$^2$, good adhesion activity can be imparted to the surface of the molded article, which is preferable.

The higher the surface free energy of the molded article is, the more excellent the above characteristics tend to be, which is preferable. However, when the surface free energy is too high, there is a possibility that the surface of the material becomes brittle or the activity does not last for a long period of time, and the surface does not exhibit good adhesiveness when the adhesive is applied.

The surface free energy of a molded article of a carbon fiber composite material can be controlled by a mold release agent and a mold release film used during molding, and a surface treatment after molding. The smaller the content of the fluorine element contained in the release agent or the release film, the larger the surface free energy. The surface free energy can be increased by subjecting the surface of the carbon fiber composite material after molding to atmospheric pressure plasma treatment.

The surface free energy ($\gamma_{TOTAL}$) can be changed depending on the resin used as the matrix resin forming the carbon fiber composite material such as an epoxy resin, a polyphenylene sulfide resin, a polypropylene resin, a vinyl ester resin, an unsaturated polyester resin, or a cyanate ester resin.

The ratio $\{\gamma_p/\gamma_d\}$ of the surface free energy polar component ($\gamma_p$) with respect to the surface free energy dispersion component ($\gamma_d$) in the molded article of the carbon fiber composite material is preferably 0 or more and 1 or less, more preferably 0.1 to 1, still more preferably 0.2 to 1, and most preferably 0.3 to 1. When the ratio of the surface free energy polar component with respect to the surface free energy dispersion component is within the above range, good reactivity with an adhesive can be imparted to the surface of the molded article. At the same time, the strength of the surface of the molded article can be excellently maintained. As a result, fracture which tends to occur when an external impact is applied to the bonded body with a metal such as delamination fracture at the interface between the adhesive and the molded article, and fracture of the molded article itself of the carbon fiber composite material in the vicinity of the surface thereof, can be made less likely to occur.

The surface free energy polar component ($\gamma_p$) can be controlled by a mold release agent and a mold release film used during molding, or a surface treatment after molding. For example, when the surface of the molded article of the carbon fiber composite material after molding is subjected to an atmospheric pressure plasma treatment, the type of gas to be used, the distance between the plasma nozzle and the molded article at the time of treatment, and the treatment speed may be adjusted so that the type and amount of the functional group to be introduced to the surface of the molded article should be adjusted, whereby the surface free energy polar component ($\gamma_p$) can be controlled.

Regarding the surface of the molded article of the carbon fiber composite material, the ratio $\{F/C\}$ of the number of atoms of fluorine (F) with respect to the number of atoms of carbon (C) on the surface of the molded article of the carbon fiber composite material, measured by X-ray photoelectron spectroscopy, is preferably 0 or more and 0.5 or less. It is more preferably 0 to 0.4, still more preferably 0 to 0.3, and most preferably 0 to 0.2.

As the fluorine concentration on the surface of the molded article is lower, higher adhesiveness can be imparted. This is because the fluorine element inhibits chemical interaction between the epoxy group of the adhesive and the surface of the molded article of the carbon fiber composite material.

The surface free energy of a molded article of a carbon fiber composite material can be controlled by a mold release agent or a mold release film used during molding, and a surface treatment after molding. Molding with a release agent or a release film having a smaller content of the fluorine element, or applying an atmospheric pressure plasma treatment to the surface of the carbon fiber composite material after molding, makes it possible to reduce the concentration of the fluorine element.

When a release agent or a release film containing fluorine is used in molding, the ratio may be actually 0.1 or more and 3.0 or less.

Regarding the surface of the molded article of the carbon fiber composite material, the ratio $\{O/C\}$ of the number of atoms of oxygen (O) with respect to the number of atoms of carbon (C) on the surface of the molded article of the carbon fiber composite material, measured by X-ray photoelectron spectroscopy, is preferably 0.2 or more and 1.2 or less. It is more preferably 0.2 to 1.0 and most preferably 0.2 to 0.8.

As the oxygen concentration on the surface of the molded article is higher, higher adhesiveness can be imparted. This is because many functional groups containing the oxygen element are present on the surface of the molded article of the carbon fiber composite material, which makes it likely to cause chemical interaction with the epoxy group of the adhesive.

When the value of {O/C} is more than 1.2, the surface of the molded article reacts with water vapor in the air and the like, which makes it substantially difficult to store the molded article having {O/C} in a large value.

The ratio of the number of atoms of oxygen (O) with respect to the number of atoms of carbon (C) on the surface can be controlled by treating the surface after molding. For example, by subjecting the surface of the obtained molded article to the atmospheric pressure plasma treatment, more oxygen elements can be introduced into the surface of the molded article of the carbon fiber composite material. To control the amount of oxygen elements to be introduced, the following may be performed, for example: treating with a reduced distance between a nozzle for applying atmospheric pressure plasma and a molded article; or reducing a treating speed. Furthermore, the oxygen concentration of the surface of the molded article can be increased by using oxygen gas or nitrogen gas instead of dry air as the gas to be introduced into the plasma generating nozzle at the time of plasma irradiation, and further adjusting the gas concentration, the mixing ratio, and the flow rate (L/min) thereof.

The molded article of the carbon fiber composite material is preferably such that, when the surface of the molded article is measured by X-ray photoelectron spectroscopy and data of narrow scan C1s are subjected to peak deconvolution, an area ratio {X/M} of peaks (X) attributed to C—O and C—N with respect to a main peak (M) (attributed to bonding of CHx, C—C) having the largest peak area observed around 284.6 eV is 0.4 or more and 0.8 or less. The ratio is more preferably 0.6 to 0.8.

The molded article is preferably such that, when the surface of the molded article is measured by X-ray photoelectron spectroscopy and data of narrow scan C1s are subjected to peak deconvolution, an intensity ratio {Y/M} of a peak (Y) attributed to C=O with respect to a main peak (M) having the largest peak area is 0.1 or more and 0.3 or less. The ratio is more preferably 0.15 to 0.3.

The molded article is preferably such that, when the surface of the molded article is measured by X-ray photoelectron spectroscopy and data of narrow scan C1s are subjected to peak deconvolution, an intensity ratio {Z/M} of a peak (Z) attributed to C(=O)—O with respect to a main peak (M) having the largest peak area is preferably 0.1 or more and 0.3 or less. The ratio is more preferably 0.15 to 0.3.

When there are many functional groups of C—O, C—N, C=O, and C(=O)—O in the functional groups present on the surface of the molded article, this means that there are many points at which chemical interaction with the epoxy group in the adhesive occurs, and good adhesive strength can be imparted to between the carbon fiber composite material and the adhesive. Among them, it is most preferable that C=O having a high reactivity with an epoxy group has a high peak intensity.

The type of the functional group on the surface of the molded article can be controlled depending on the type of the resin composition contained in the carbon fiber composite material, or by the surface treatment after molding. For example, for the resin composition, the concentration of the functional group can be adjusted by using a resin containing a large amount of components of C—O, C—N, C=O, and C(=O)—O in the chemical structure of the resin, or by increasing the concentration of oxygen in the atmosphere generating plasma when the surface after molding is subjected to the atmospheric pressure plasma treatment.

Regarding the molded article of the carbon fiber composite material, the ratio $\{F_{11}/F_0\}$ is preferably 0.75 or more and 1 or less, the ratio being a ratio between a tensile lap-shear strength $(F_0)$ of a bonded body in which a metal is bonded to a surface of the molded article with an adhesive layer containing an epoxy compound being interposed therebetween, and a tensile lap-shear strength $(F_{11})$ of a bonded body prepared in the same manner measured after a wet heat treatment. The ratio is more preferably 0.80 to 1, and most preferably 0.85 to 1.

When the ratio $\{F_{11}/F_0\}$ of the tensile lap-shear strength is in the above range, a bonded body obtained by bonding the molded article and a metal with an adhesive layer interposed therebetween, when used as a member in an automobile, a member in an aircraft, or a member in a building, can maintain a desired bonding strength for a long period of time. Therefore, high durability and reliability can be imparted to these end products, which is preferable.

This ratio $\{F_{11}/F_0\}$ of the tensile lap-shear strength can be controlled by adjusting the content of epoxy groups, hygroscopicity, and heat resistance of the adhesive to be used.

The following description describes an example of a method of producing a molded article when a press-molding method is used and a carbon fiber prepreg is used as the carbon fiber composite material before molding.

For example, a unidirectional prepregs P3842S-20 (manufactured by Toray Industries, Inc.) was laminated in layers so that the directions of the filaments of the carbon fiber are parallel to each other in a configuration of (0/0). Then, polypropylene films ("TORAYFAN" (registered trademark) B02500 manufactured by Toray Industries, Inc., thickness: 50 μm, glossy type) are placed on both surfaces of the laminate obtained, and the laminate is heated and compressed at 120° C. with a pressure of 2 MPa for 40 minutes using a heating press to obtain a laminate having a thickness of about 3 mm.

The obtained laminate is subjected to a treatment in which the laminate is irradiated with plasma generated in air at normal temperature and normal humidity using a plasma generator (Generator FG5001, rotation nozzle RD 1004) manufactured by Nihon Plasmatreat Inc. such that a distance between a plasma treatment nozzle and the laminate is set to 5 mm and a speed at which the treatment nozzle moves on the laminate is set to 5 m/min, whereby a molded article of a carbon fiber composite material having the desired features is obtained.

As treating conditions of the plasma treatment, it is preferable that the rotation speed of the plasma nozzle is 1000 to 3000 rpm, the back pressure of the plasma nozzle is 40 to 60 mbar, and the flow rate of gas from the plasma nozzle is 35 to 55 L/min. More preferably, the rotation speed of the plasma nozzle is 1500 to 2800 rpm, the back pressure of the plasma nozzle is 45 to 55 mbar, and the flow rate of gas from the plasma nozzle is 40 to 50 L/min. The treatment under these conditions makes it possible to effectively and efficiently introduce the functional group into the surface of the molded article of the carbon fiber composite material.

The molded article of the carbon fiber composite material can form a strong bond with a metal with an adhesive layer interposed therebetween. In particular, the molded article of the carbon fiber composite material is preferable when the molded article is used as a structural member of an automobile, an aircraft, or a building as a final product that is difficult to disassemble or repair after completion. This is because our molded article is excellent in bondability with a metal material, and is able to maintaining a bonding strength for a long period of time, which makes it possible to impart high reliability, compared to a molded article of a conventional carbon fiber composite material.

EXAMPLES

Our molded articles and methods will be described based on examples. Hereinafter, a molded article of a carbon fiber composite material is simply referred to as a molded article.

I. Method of Measuring Characteristics

The characteristics were measured as follows.
1. Tensile Lap-Shear Strength

An overlapped test specimen obtained by applying an adhesive onto a bonding surface of a molded article and bonding a metal material thereon was used to measure a tensile lap-shear strength. A tensile test was performed using a universal testing machine. A load when the overlapped test specimen was broken was measured, and a fracture state of a bonded portion thereof was visually observed.

The tensile test was performed in an atmosphere of 23° C. and 50% RH, with a distance between chucks of the tester being set to 115 mm.
2. Broken State of Bonded Portion The broken state of the bonded portion was observed and classified as follows. In the table showing the results, the states are described as A, B, and C below.
  A. Adhesive cohesive failure: this refers to a state in which, after a tensile shear test, an adhesive adheres to both of the metal side and the molded article side of the test body broken.
  B. Separation at interface between molded article and adhesive: this refers to a state of a broken test body after a tensile shear test in which all the adhesive layer remains on the metal side, and no adhesive is attached to the carbon fiber composite material side.
  C. Separation at interface between metal and adhesive: this refers to a state of a broken test body after a tensile shear test in which all the adhesive layer remains on the molded article side, and no adhesive is attached to the metal side.
3. Surface Free Energy A test piece to be measured was placed on a horizontally placed glass plate. A fully automatic handy contact angle meter MSA from KRUSS GmbH and software ADVANCE (Ver. 1.8) were used, and 2 μL of ultrapure water ("CAS RN": 7732-18-5), as well as 2 μL of diiodomethane ("CAS RN": 75-11-6), were dropped onto the specimen. The droplet formed on the test piece 3 seconds after the dropping was observed from the lateral side, and the contact angle θ formed between the test piece and the droplet was measured.

In the calculation of the contact angle θ (°), the same measurement was performed at arbitrary five points on the test piece, and the average value of the measurement results at three points excluding the maximum value and the minimum value was taken as the contact angle θ (°) of the test body.

Using the obtained contact angle θ (°), the surface free energy (γTOTAL), the surface free energy dispersion component ($\gamma_d$), and the surface free energy polar component ($\gamma_p$) of the molded article were calculated by the Owens-Wendt-Rabel-Kaelble method.

The contact angle of ultrapure water was measured under the following conditions:
  Contact angle measurement ambient temperature: 20° C.
  Surface tension data of ultrapure water used in calculation of surface free energy: 72.8 mN/m (Polarity 51.0 mN/m, dispersion 21.8 mN/m) (Cited Document: J. Colloid Interface Sci, 127, 1989, 189-204, by Janczuk, B.).

The contact angle of diiodomethane was measured under the following conditions:
  Contact angle measurement ambient temperature: 25° C.
  Surface tension data of diiodomethane used in calculation of surface free energy: 50.8 mN/m (Polarity 0 mN/m, dispersion 50.8 mN/m) (Cited Document: J. Colloid Interface Sci, 119, 1987, 352-361, by Strom, G.).
4. X-Ray Photoelectron Spectroscopy Measurement A photoelectron spectrometer (model: Quantera SHM) manufactured by PHI was used, and small pieces of the molded article were arranged on the sample stage. Qualitative analysis (wide scan analysis) in which the inside of the sample chamber was kept at $1 \times 10^8$ Torr, and the entire energy range was scanned under the following conditions to detect an element with high sensitivity, and high-resolution analysis (narrow scan analysis) in which a narrow energy range was scanned under high energy decomposition conditions, were performed on the carbon element (Cis). Thereafter, data processing and analysis were performed. For each analysis, linear baselines were drawn in the range of 0 to 1100 eV and 278 to 298 eV, whereby the area intensity of each peak was calculated.

Figure 1:
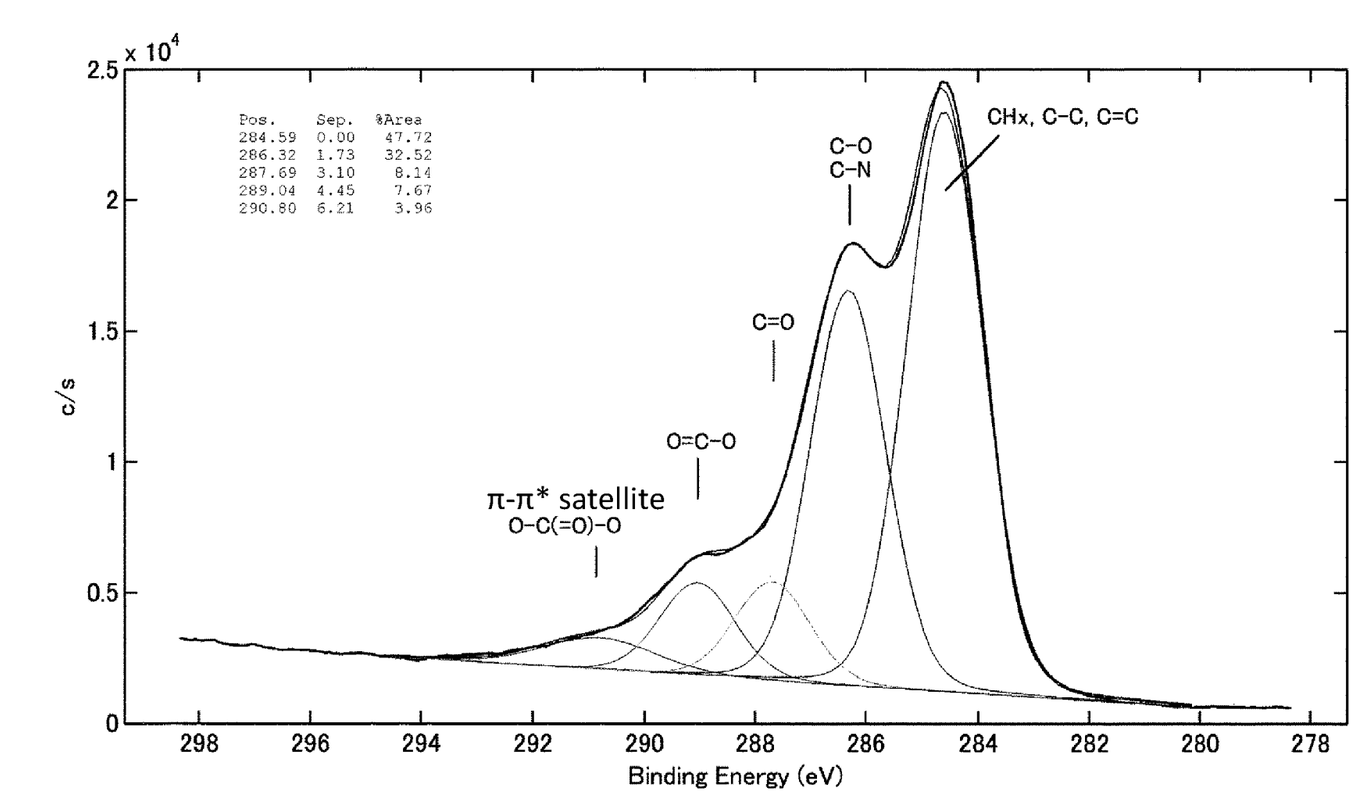
The Drawing is a graph showing narrow scan with deconvoluted C1s peaks obtained by measurement of a molded article of a carbon fiber composite material by X-ray photoelectron spectroscopy.

For the narrow scan analysis of C1s, as shown in FIG. 1, peak deconvolution was carried out so that a peak around 284.61 eV was a peak of $CH_x$, C—C, and C=C bonds, a peak around 286.34 eV was a peak of C—O and C—N bonds, a peak around 287.66 eV was a peak of a C=O bond, a peak around 289.01 eV was a peak of O=C—O bond, a peak around 290.80 eV was a peak of π-π* satellite and a O—C(=O)—O bond. Then, the respective peak areas were calculated.

The atomic number ratio of the elements (atomic %) obtained by the wide-scan analysis was defined as representing the numbers of atoms of the corresponding elements on the surface of the molded article. In addition, the intensity of the peak of the C—O and C—N bonds obtained by the narrow scan analysis was given as X, the intensity of the peak of the $CH_x$, C—C, C=C bonds was given as M, the intensity of the peak of the C=O bond was given as Y, and the intensity of the peak of the O=C—O bond was given as Z.

The measurement conditions were as follows:
  Excited X-rays: monochromatic Al $K\alpha_{1,2}$ rays (1486.6 eV)
  X-ray diameter: 200 μm
  Photoelectron detection angle: 45° (inclination of the detector with respect to the sample surface)
  X-ray output: 15 kV, 45 W.
The data processing was as follows:
  Smoothing: 9-point smoothing
  Horizontal axis correction: The main peak (M) (CHx, C—C bonds) of the C1s scan was set to 284.6 eV.
5. Surface Roughness Ra The center line average roughness Ra of the molded article was measured using a probe type surface roughness meter under the following conditions. Measurement was performed by scanning 20 times in a direction perpendicular to the carbon fiber of the molded article, and the average value of the obtained results was taken as the average roughness Ra.

Measuring apparatus: High-precision thin film step measuring instrument ET-10 from Kosaka Laboratory, Ltd.
Stylus tip radius: 0.5 μm
Stylus load: 5 mg
Measurement length: 1 mm
Cut-off value: 0.08 mm
Measurement environment: Temperature: 23° C., humidity: 65% RH 6. Ten-Point Average Roughness Rz and Average Length RSm of Roughness Curve Element Three-dimensional microfigure measuring instrument (model: ET-350K) and the three-dimensional surface roughness analysis system (Model TDA-22) from Kosaka Laboratory Ltd. were used to measure the surface roughness Rz (ten-point average roughness) and the average length RSm of the roughness curve elements.

Conditions are as follows, and each value is an average value obtained from 20 measurement operations:

Stylus diameter: 2 μm
Stylus load: 0.04 mN
Longitudinal magnification: 50,000 times
Cut-off: 0.5 mm
Feed pitch: 5 μm
Measurement length: 0.5 mm
Measurement area: 0.2 mm$^2$
Measurement speed: 0.1 mm/sec.

7. Pre-Treatment Time Required for Material Surface Treatment Before Application of Adhesive.

The treatment time required for treatment of the surface of the molded article performed after molding the molded article, removing the molded article from a die or the like, and before applying the adhesive was evaluated according to the following criteria from the viewpoint of the takt time of the production process.

The time required to uniformly treat the surface of a test body having a width of 25 mm and a length of 100 mm was classified as follows:

Treatment time of 1 min or less: A
Treatment time of more than 1 min: B.

8. Durability Test

An overlapped test specimen obtained by boding with an adhesive was left under a wet-heat condition in an atmosphere at 85° C. and 95% RH for 30 days, then naturally cooled, and left in a standard state (23±2° C., 50±5% RH) for 24 hours using a highly accelerated life tester (desk-top Constant Climate Cabinet LHU-114 from ESPEC CORPORATION). The bonded test body was subjected to a tensile test 20 times under the same conditions as those described above, and an average value ($F_{11}$) of loads at the time of fracture was obtained. From the average value ($F_{11}$) of the obtained loads and $F_0$, the strength retention ratio F11/F0 was determined by the formula below:

Strength retention ratio (%)=($F_{11}/F_0$)×100.

9. Overall evaluation

Evaluation was performed according to the following criteria. "The bonding strength is within the specified range" means that "the tensile lap-shear strength ($F_0$) is 10 MPa or more and 40 MPa or less."

When the bonding strength is not within the specified range: Defective
If the pretreatment time exceeds 1 minute: Defective
When the bonding strength is within the specified range, the treatment is performed within 1 minute, and $F_{11}/F_0$ is larger than 0.8: Excellent
When the bonding strength is within the specified range, the treatment is performed within 1 minute, and $F_{11}/F_0$ is more than 0.75 and 0.8 or less: Good
When the bonding strength is within the specified range, the treatment is performed within 1 minute, and $F_{11}/F_0$ is more than 0.6 and 0.75 or less: Normal II. Molded Articles and Materials Used Therein in Examples and Comparative Examples Molded Article 1

A unidirectional carbon fiber prepreg (P3832S-20 manufactured by Toray Industries, Inc.) was laminated in sixteen layers such that directions of filaments thereof are all aligned, and polypropylene films ("TORAYFAN" (registered trademark) B02500 manufactured by Toray Industries, Inc., thickness: 50 μm, glossy type) were placed on both surfaces of the laminate. Thereafter, by a press-molding method, a Molded article 1 having an average thickness of 3 mm was obtained. The surface free energy, the surface free energy dispersion component, the surface free energy polar component, the measurement results by X-ray photoelectron spectroscopy, and the analysis results in Examples described below in each of which this Molded article 1 was used are shown in the table. Thereafter, each molded article was cut into a rectangular piece of 45 mm×10 mm.

Molded Article 2

A Molded article 2 was obtained by the molding performed in the same manner as that in the production of the Molded article 1 except that a fluororesin film ("AFLEX" (registered trademark) 25MW 1080NT manufactured by AGC Inc.) was used in place of the polypropylene film. The surface free energy, the surface free energy dispersion component, the surface free energy polar component, the measurement results by X-ray photoelectron spectroscopy, and the analysis results in Examples described below in each of which this Molded article 2 was used are shown in the table.

Thereafter, each molded article was cut into a rectangular piece of 45 mm×10 mm.

Adhesive 1

A two-liquid curable epoxy-based adhesive "AUTOMIX™ (registered trademark) PANEL BOND 8115" manufactured by 3M was used and applied to a test piece using a dedicated hand gun (AUTOMIX hand gun 8117 manufactured by 3M) and a dedicated mixing nozzle (AUTOMIX mixing nozzle 8193 manufactured by 3M). To control the bonding area, masking paper was used so that the adhesive did not adhere to outside a desired area. The adhesive layer thickness was adjusted with glass beads of φ0.5±0.1 mm.

Adhesive 2

A two-liquid curable urethane-based adhesive "LORD" (registered trademark) 7545 A/D" (A is a main material, and D is a curing agent) manufactured by LORD Corporation was used and applied to a test piece using a hand gun and a dedicated mixing nozzle. To control the bonding area, masking paper was used so that the adhesive did not adhere to outside a desired area. The adhesive layer thickness was adjusted with glass beads of φ0.5±0.1 mm.

Metal 1

Iron (grade SPCC-SD) (thickness: 1.5 mm) was cut into a rectangular piece of 45 mm×10 mm with a laser, and the surface of the rectangular piece was degreased with acetone, before being used.

Molded Article 3

A Molded article 3 was obtained by the molding in the same manner as that in the production of the Molded article 1 except that a poly(-4-methylpentene-1) film ("Opulent" (registered trademark) X88B manufactured by Mitsui Chemicals Tohcello, Inc.) was used in place of the polypropylene film. The surface free energy, the surface free energy dispersion component, the surface free energy polar component, the measurement results by X-ray photoelectron spectroscopy, and the analysis results in Examples described below in each of which this Molded article 3 was used are shown in Table 1.

Thereafter, each molded article was cut into a rectangular piece of 45 mm×10 mm.

Molded Article 4

A Molded article 4 was obtained by the molding in the same manner as that in the production of the Molded article 1 except that a poly(-4-methylpentene-1) film ("Opulent" (registered trademark) X44B manufactured by Mitsui Chemicals Tohcello, Inc.) was used instead of the polypropylene film. The surface free energy, the surface free energy dispersion component, the surface free energy polar component, the measurement results by X-ray photoelectron spectroscopy, and the analysis results in Examples described below in each of which this Molded article 4 was used are shown in the table.

Thereafter, each molded article was cut into a rectangular piece of 45 mm×10 mm.

Molded Article 5

A Molded article 5 was obtained by the molding in the same manner as that in the production of the Molded article 1 except that a cycloolefin polymer film ("ZEONOR Film" (registered trademark) ZF16-050 manufactured by Zeon Corporation) was used in place of the polypropylene film. The surface free energy, the surface free energy dispersion component, the surface free energy polar component, the measurement results by X-ray photoelectron spectroscopy, and the analysis results in Examples described below in each of which this Molded article 5 was used are shown in Table 1.

Thereafter, each molded article was cut into a rectangular piece of 45 mm×10 mm.

III. Examples and Comparative Examples

Example 1

The surface of each rectangular piece of the Molded article 1 was subjected to the atmospheric pressure plasma treatment. The atmospheric pressure plasma treatment was performed by irradiating the carbon fiber composite material 1 with plasma generated in air at normal temperature and normal humidity using a plasma generator (Generator FG5001, rotation nozzle RD1004) manufactured by Nihon Plasmatreat Inc. such that a distance between a plasma treatment nozzle and the molded article was set to 5 mm, a speed at which the treatment nozzle moved on the Molded article 1 was set to 5 m/min, the rotation speed of the plasma nozzle was set to 1600 RPM, the flow rate of gas introduced into the nozzle was set to 45 L/min, and the wattage after boosting was set to 433 W.

The surface free energy, the surface free energy dispersion component, the surface free energy polarity component, and the measurement and analysis results by X-ray photoelectron spectroscopy, regarding the Molded article 1 after the plasma treatment, are shown in the table.

Within 30 minutes after the treatment, the Adhesive 1 was applied onto the plasma-treated surface of the Molded article 1, and the molded article and the Metal 1 were bonded, whereby an overlapped test specimen of Type B (adhesive thickness: 0.5 mm) in accordance with ISO 19095-2 (2015) was prepared.

At the time of preparing the overlapped test specimen, the applied adhesive was left to stand at 60° C. for 5 hours in a dry air atmosphere in a hot air oven so that the adhesive was completely cured. In this way, an overlapped test specimen of a molded article and a metal was prepared. The test piece was stored in an atmosphere of 25° C. and 50% RH.

Within 1 week from the production of the overlapped test specimen, a tensile test was performed at room temperature of 25° C. and a test speed of 5 mm/min using a test specimen holding device of an apparatus for evaluating the tensile lap-shear strength described in ISO 19095-3 (2015). A universal testing system 5969 manufactured by INSTRON was used as a tensile tester, evaluation was performed (n=3), and the average value thereof was defined as a tensile lap-shear strength ($F_0$).

After an overlapped test specimen was produced, then, a sample was produced by a method described above regarding the durability test. Thereafter, a tensile test was performed at room temperature of 25° C. and a test speed of 5 mm/min using a test specimen holding device in accordance with ISO 19095-3 (2015). A universal testing system 5969 manufactured by INSTRON was used as a tensile tester, evaluation was performed (n=3), and the average value thereof was defined as a tensile lap-shear strength ($F_{11}$).

The evaluation results of the obtained overlapped test specimens are shown in the table.

Example 2

An example implemented under the same conditions as in Example 1 except that the Molded article 2 was used in place of the molded product 1 in Example 1 was given as Example 2.

Example 3

The Adhesive 1 was applied to one of the surfaces of the Molded article 1 and was bonded with the Metal 1 to prepare an overlapped test specimen (adhesive thickness: 0.5 mm) in accordance with ISO 19095-2 (2015).

Within 1 week from the production of the overlapped test specimen, a tensile test was performed at room temperature of 25° C. and a test speed of 5 mm/min using a test specimen holding device in accordance with ISO 19095-3 (2015). A universal testing system 5969 manufactured by INSTRON was used as a tensile tester, evaluation was performed (n=3), and the average value thereof was defined as a tensile lap-shear strength ($F_0$).

After an overlapped test specimen was produced, then, the specimen was subjected to a wet heat treatment. Thereafter, a tensile test was performed at room temperature of 25° C. and a test speed of 5 mm/min using a test specimen holding device in accordance with ISO 19095-3 (2015). A universal testing system 5969 manufactured by INSTRON was used as a tensile tester, evaluation was performed (n=3), and the average value thereof was defined as a tensile lap-shear strength ($F_{11}$).

The evaluation results of the obtained overlapped test specimens are shown in Table 1.

Example 4

An example implemented under the same conditions as in Example 1 except that the molded product 3 was used in place of the Molded article 1 in Example 1 was given as Example 4.

Example 5

An example implemented under the same conditions as in Example 1 except that the molded product 4 was used in place of the Molded article 1 in Example 1 was given as Example 5.

Example 6

An example implemented under the same conditions as in Example 1 except that the molded product 5 was used in place of the Molded article 1 in Example 1 was given as Example 6.

Example 7

An example was implemented, as Example 7, under the same conditions as in Example 1 except that the gas to be introduced into the treatment nozzle was not air, but a mixed gas of oxygen, 70 vol %, and air, 30 vol %, flowing at a flow rate of 45 L/min, used for plasma generated under normal temperature and normal humidity, and that, after the molded article was cut into a rectangular piece of 45 mm×10 mm, it was degreased with acetone before being used.

Example 8

An example was implemented, as Example 8, under the same conditions as in Example 1 except that the gas to be introduced into the treatment nozzle was not air, but a mixed gas of nitrogen, 70 vol %, and air, 30 vol %, flowing at a flow rate of 45 L/min, used for plasma generated under normal temperature and normal humidity. After the molded article was cut into a rectangular piece of 45 mm×10 mm, it was degreased with acetone before being used.

Example 9

An example was implemented, as Example 9, under the same conditions as in Example 2 except that "FURIRISU" (registered trademark) 65 manufactured by NEOS Co., Ltd. was diluted 5 times with distilled water, and sprayed over the surface of the die of the press device at the time of molding the Molded article 2, in place of "AFFLEX" (registered trademark) 25MW 1080NT) sprayed over both surfaces of the laminate. After the molded product was cut into a rectangular piece of 45 mm×10 mm, it was degreased with acetone before being used.

Example 10

An example was implemented, as Example 10, under the same conditions as in Example 2 except that "Die Free" (registered trademark) GW-251 manufactured by DAIKIN INDUSTRIES, Ltd. was diluted 5 times with distilled water, and sprayed over the surface of the die of the press device at the time of molding the Molded article 2, in place of "AFFLEX" (registered trademark) 25MW 1080NT) sprayed over both surfaces of the laminate. After the molded product was cut into a rectangular piece of 45 mm×10 mm, it was degreased with acetone before being used.

Example 11

An example was implemented, as Example 11, under the same conditions as in Example 2 except that the Adhesive 2, i.e., the two-liquid urethane adhesive LORD 7545 manufactured by LORD was used in place of the Adhesive 1. After the molded article was cut into a rectangular piece of 45 mm×10 mm, it was degreased with acetone before being used.

Comparative Example 1

An example was implemented, as Comparative Example 1, under the same conditions as in Example 1 except that the Molded article 2 was used in place of the molded product 1 in Example 1.

Comparative Example 2

A unidirectional carbon fiber prepreg (P3832S-20 manufactured by Toray Industries, Inc.) was laminated in sixteen layers such that directions of filaments thereof are all aligned, and polyvinyl alcohol films ("POVAL" (registered trademark) films manufactured by KURARAY Co., Ltd. #4000) were placed on both surfaces of the laminate. Thereafter, by a press-molding method, a Molded article 1 having an average thickness of 3 mm was attempted to be obtained. However, the polyvinyl alcohol films did not separate from the molded article after the press-molding, and a test specimen could not be produced.

TABLE 1

|  |  | Example 1 | EXAMPLE 2 | EXAMPLE 3 | EXAMPLE 4 |
|---|---|---|---|---|---|
| Release film or release agent | | Polypropylene film | Fluororesin film | Polypropylene film | Poly(-4-methylpentene -1) film |
| Adhesive | | Two-liquid epoxy | Two-liquid epoxy | Two-liquid epoxy | Two-liquid epoxy |
| Surface treatment | | Atmospheric Pressure Plasma | Atmospheric Pressure Plasma | Not applied | Not applied |
| Gas used for plasma treatment (mixing ratio) | | Air (100%) | Air (100%) | — | — |
| Plasma generation Power | W | 400 | 400 | — | — |
| Plasma treatment gas flow rate | L/min | 55 | 55 | — | — |
| Plasma density | | 7.3 | 7.3 | — | — |

TABLE 1-continued

|  |  | Example 1 | EXAMPLE 2 | EXAMPLE 3 | EXAMPLE 4 |
|---|---|---|---|---|---|
| Tensile lap-shear strength ($F_0$) | (MPa) | 25 | 23 | 22 | 23 |
| Tensile lap-shear strength ($F_{11}$) | (MPa) | 23 | 20 | 17 | 17 |
| $F_{11}/F_0$ |  | 0.92 | 0.87 | 0.77 | 0.74 |
| Broken state of bonded portion |  | A | A | A | A |
| Surface roughness Ra | (μm) | 0.5 | 1.8 | 0.3 | 1.3 |
| Surface roughness Rz | (μm) | 7 | 20 | 5 | 11 |
| Surface roughness RSm | (μm) | 135 | 140 | 110 | 120 |
| Surface free energy | (mJ/m$^2$) | 72 | 54 | 44 | 40 |
| Surface free energy polar component (γp) | (mJ/m$^2$) | 30 | 25 | 7 | 5 |
| Surface free × energy dispersion component (γd) | (mJ/m$^2$) | 42 | 29 | 37 | 35 |
| $\gamma_p/\gamma_d$ |  | 0.7 | 0.9 | 0.2 | 0.1 |
| {F/C} |  | 0.1 | 0.4 | 0.1 | 0.1 |
| {O/C} |  | 0.5 | 0.4 | 0.3 | 0.2 |
| {X/M} |  | 0.8 | 0.7 | 0.5 | 0.3 |
| {Y/M} |  | 0.3 | 0.2 | 0.2 | 0.1 |
| {Z/M} |  | 0.2 | 0.1 | 0.1 | 0.1 |
| Pretreatment time |  | A | A | A | A |
| Overall evaluation |  | Good | Good | Good | Normal |

TABLE 2

|  |  | EXAMPLE 5 | EXAMPLE 6 | Example 7 | EXAMPLE 8 | EXAMPLE 9 |
|---|---|---|---|---|---|---|
| Release film or release agent |  | Poly(-4-methylpentene-1) film | Cycloolefin polymer film | Fluororesin film | Fluororesin film | "FURIRISU" 65 |
| Adhesive |  | Two-liquid epoxy | Two-liquid epoxy | Two-liquid epoxy | Two-liquid epoxy | Two-liquid epoxy |
| Surface Treatment |  | Not applied | Not applied | Atmospheric Pressure Plasma | Atmospheric Pressure Plasma | Atmospheric Pressure Plasma |
| Gas used for plasma treatment (mixing ratio) |  | — | — | Oxygen 70% Air 30% | Nitrogen 70% Air 30% | Air (100%) |
| Plasma generation power | W | — | — | 440 | 440 | 420 |
| Plasma treatment gas flow rate | L/min | — | — | 40 | 40 | 50 |
| Plasma density |  | — | — | 11.0 | 11.0 | 8.4 |
| Tensile lap-shear strength ($F_0$) | (MPa) | 23 | 22 | 25 | 25 | 20 |
| Tensile lap-shear strength ($F_{11}$) | (MPa) | 16 | 15 | 24 | 24 | 16 |
| $F_{11}/F_0$ |  | 0.70 | 0.68 | 0.94 | 0.94 | 0.80 |
| Broken state of bonded portion |  | A | A | A | A | A |
| Surface roughness Ra | (μm) | 1.6 | 1.0 | 2.0 | 1.9 | 0.3 |
| Surface roughness Rz | (μm) | 15 | 10 | 25 | 23 | 5 |
| Surface roughness RSm | (μm) | 122 | 115 | 150 | 147 | 130 |
| Surface free Energy | (mJ/m$^2$) | 40 | 33 | 60 | 58 | 49 |
| Surface free energy polar component (γp) | (mJ/m$^2$) | 5 | 3 | 30 | 28 | 20 |
| Surface free × energy dispersion component (γd) | (mJ/m$^2$) | 35 | 30 | 30 | 30 | 29 |

TABLE 2-continued

|  | EXAMPLE 5 | EXAMPLE 6 | Example 7 | EXAMPLE 8 | EXAMPLE 9 |
|---|---|---|---|---|---|
| $\gamma_p/\gamma_d$ | 0.1 | 0.1 | 1.0 | 0.9 | 0.7 |
| {F/C} | 0.1 | 0.1 | 0.2 | 0.3 | 0.4 |
| {O/C} | 0.2 | 0.2 | 1.0 | 0.5 | 0.4 |
| {X/M} | 0.2 | 0.2 | 0.8 | 0.7 | 0.6 |
| {Y/M} | 0.1 | 0.1 | 0.3 | 0.2 | 0.2 |
| {Z/M} | 0.1 | 0.1 | 0.3 | 0.2 | 0.1 |
| Pretreatment time | A | A | A | A | A |
| Overall evaluation | Normal | Normal | Excellent | Excellent | Good |

TABLE 3

|  |  | Example 10 | Example 11 | Comparative Example 1 | Comparative Example 2 |
|---|---|---|---|---|---|
| Release film or release agent |  | "Die Free" GW-251 | Fluororesin film | Fluororesin film | polyvinyl alcohol film |
| Adhesive |  | Two-liquid epoxy | two-liquid urethane | Two-liquid epoxy | — |
| Surface treatment |  | Atmospheric Pressure Plasma | Atmospheric Pressure Plasma | Not applied | — |
| Gas used for plasma treatment (mixing ratio) |  | Air (100%) | Air (100%) | — | — |
| Plasma generation power | W | 420 | 400 | — | — |
| Plasma treatment gas flow rate | L/min | 50 | 55 | — | — |
| Plasma density |  | 8.4 | 7.3 | — | — |
| Tensile lap-shear strength ($F_0$) | (MPa) | 20 | 12 | 5 | — |
| Tensile lap-shear strength ($F_{11}$) | (MPa) | 16 | 10 | 3 | — |
| $F_{11}/F_0$ |  | 0.80 | 0.83 | 0.60 | — |
| Broken state of bonded portion |  | A | A | B | — |
| Surface roughness Ra | (μm) | 0.4 | 1.8 | 1.1 | — |
| Surface roughness Rz | (μm) | 6 | 20 | 11 | — |
| Surface roughness RSm | (μm) | 132 | 140 | 134 | — |
| Surface free energy | (mJ/m²) | 51 | 54 | 28 | — |
| Surface free energy polar component (γp) | (mJ/m²) | 23 | 25 | 8 | — |
| Surface free energy dispersion component (γd) | (mJ/m²) | 28 | 29 | 20 | — |
| $\gamma_p/\gamma_d$ |  | 0.8 | 0.9 | 0.4 | — |
| {F/C} |  | 0.4 | 0.4 | 0.6 | — |
| {O/C} |  | 0.4 | 0.4 | 0.1 | — |
| {X/M} |  | 0.6 | 0.7 | 0.3 | — |
| {Y/M} |  | 0.2 | 0.2 | 0 | — |
| {Z/M} |  | 0.1 | 0.1 | 0 | — |
| Pretreatment time |  | A | A | A | A |
| Overall evaluation |  | Good | Excellent | Defective | Defective |

INDUSTRIAL APPLICABILITY

Our molded article of the carbon fiber composite material is excellent in adhesiveness and long-term stability of adhesiveness compared to conventional carbon fiber composite materials, and thus is particularly useful in the fields of automobiles, airplanes, and buildings having portions that need to be bonded with metal with an adhesive. In particular, our molded articles are suitable for a bonding structure for bonding an outer member made of a metal material with an inner member, in a panel structure of an automobile body such as a hood or a door. Furthermore, for example, by changing the resin composition to be combined with the carbon fiber, characteristics other than adhesiveness can be freely adjusted, and thus it is possible to develop a wide range of application.

The invention claimed is:

1. A molded article of a carbon fiber composite material including at least a carbon fiber and a resin composition, wherein
the molded article has a surface roughness Ra of 0.01 μm or more and 2 μm or less, and a tensile lap-shear strength (F0) is 10 MPa or more and 40 MPa or less when the molded article is bonded with a metal with an adhesive layer formed on a surface of the molded article being interposed therebetween, the adhesive layer containing an epoxy compound and having a thickness of 0.1 mm or more and 3 mm or less on a surface thereof, and a ratio $\{\gamma_p/\gamma_d\}$ between a surface free energy dispersion component ($\gamma_d$) and a surface free energy polar component ($\gamma_p$) constituting the surface free energy ($\gamma_{TOTAL}$) is 0 or more and 1 or less, and the molded article has a surface free energy ($\gamma_{TOTAL}$) of 49 mJ/m² or more and 80 mJ/m² or less, and a ratio $\{O/C\}$ of the number of atoms of oxygen (O) with respect to the number of atoms of carbon (C) on the surface of the molded article of the carbon fiber composite material, measured by X-ray photoelectron spectroscopy, is 0.4 or more and 1.2 or less.

2. The molded article according to claim 1, wherein a ratio $\{F/C\}$ of the number of atoms of fluorine (F) with respect to the number of atoms of carbon (C) on a surface of the carbon fiber composite material, measured by X-ray photoelectron spectroscopy, is 0 or more and 0.5 or less.

3. The molded article according to claim 1, wherein an intensity ratio $\{X/M\}$ of a peak (X) attributed to C—O and C—N with respect to a main peak (M) in a narrow scan with deconvoluted C1s peaks obtained by measurement on a surface of the molded article by X-ray photoelectron spectroscopy is 0.4 or more and 0.8 or less.

4. The molded article according to claim 1, wherein an intensity ratio $\{Y/M\}$ of a peak (Y) attributed to C=O with respect to a main peak (M) in a narrow scan with deconvoluted C1s peaks obtained by measurement on a surface of the molded article by X-ray photoelectron spectroscopy is 0.1 or more and 0.3 or less.

5. The molded article according to claim 1, wherein an intensity ratio $\{Z/M\}$ of a peak (Z) attributed to C(=O)—O with respect to a main peak (M) in a narrow scan with deconvoluted C1s peaks obtained by measurement on a surface of the molded article by X-ray photoelectron spectroscopy is 0.1 or more and 0.3 or less.

6. The molded article according to claim 1, wherein the carbon fiber has an average diameter of 1 to 20 μm, and an average length of 10 mm or more, and a content of the carbon fiber contained in the carbon fiber composite material is 5 to 75 vol %.

7. The molded article according to claim 1, wherein the resin composition contained in the molded article of the carbon fiber composite material is a thermosetting resin composition containing an epoxy resin.

8. The molded article according to claim 1, wherein a ratio $\{F_{11}/F_0\}$ of a tensile lap-shear strength ($F_0$) and a tensile lap-shear strength ($F_{11}$) measured after wet heat treatment is 0.80 or more and 1 or less.

9. The molded article according to claim 1, further comprising a bonded body in which metal is bonded to the surface of the molded article with an adhesive containing an epoxy compound.

10. The molded article according to claim 9, wherein a ratio $\{F_{11}/F_0\}$ of a tensile lap-shear strength ($F_0$) and a tensile lap-shear strength ($F_{11}$) measured after wet heat treatment is 0.80 or more and 1 or less.

11. The molded article according to claim 1, wherein the ratio $\{\gamma p/\gamma d\}$ is 0.3 or more and 1 or less.

12. A method of producing the molded article according to claim 1 by molding the carbon fiber composite material, comprising the step of press-molding, wherein a release agent containing a fluorine element or a release film containing a fluorine element is used in the press-molding.

13. The method according to claim 12, further comprising the step of subjecting the surface of the carbon fiber composite material to plasma treatment after press-molding.

* * * * *